United States Patent [19]
Djorup

[11] Patent Number: 6,134,958
[45] Date of Patent: Oct. 24, 2000

[54] THERMAL ANEMOMETER AIRCRAFT AIRSPEED GUST COMPONENT TRANSDUCER

[75] Inventor: Robert S. Djorup, 69 High St. Ext., Natick, Mass. 01760-4933

[73] Assignee: Robert S. Djorup, Wellesley, Mass.

[21] Appl. No.: 09/085,700

[22] Filed: May 27, 1998

[51] Int. Cl.[7] ................ G01F 13/00; G01P 5/00
[52] U.S. Cl. .......................................... 73/170.12
[58] Field of Search ........................... 73/170.01, 170.02, 73/170.11, 170.12, 204.11, 204.21, 204.25, 204.26, 204.27, 204.22, 861.85

[56] References Cited

U.S. PATENT DOCUMENTS

| | | | |
|---|---|---|---|
| 4,920,793 | 5/1990 | Djorup | 73/170.12 |
| 5,339,688 | 8/1994 | Johansson et al. | 73/204.22 |

Primary Examiner—William Oen
Attorney, Agent, or Firm—Choate, Hall & Stewart

[57] ABSTRACT

The airspeed transducer includes a pair of electrically heated cylindrical sensing elements in a parallel arrangement that is exposed broadside to the incident airstream, simultaneously measuring both instantaneous airspeed and a cross-component of airspeed. The tangent cylindrical elements are joined together with a filler in order to present a flat front face to the airstream, and they are oriented so that the plane defined by their parallel axes is perpendicular to airstream flow. The transducer is electrical with no moving parts and electronic circuitry provides for transducer excitation, operation, and signal readout. A single transducer can be used for measurement of instantaneous airspeed, angle-of-attack, turbulence cross-component, and total turbulence that can also be used in the measurement and computation of T.K.E. or turbulent kinetic energy. A combination of two transducer element pairs is also disclosed, both driven by a common electrical control circuit, providing two coherent cross-components of airspeed as well as instantaneous airspeed.

3 Claims, 3 Drawing Sheets

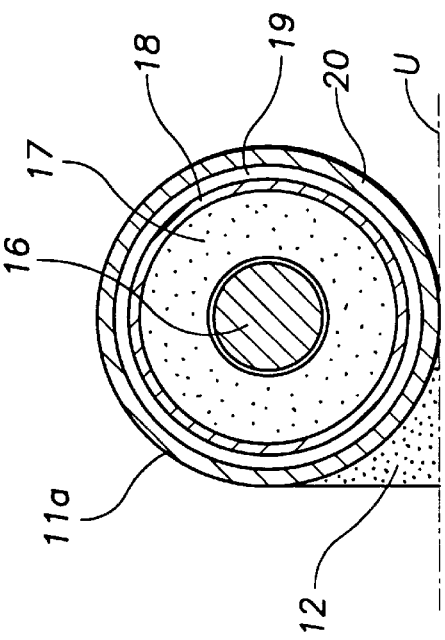
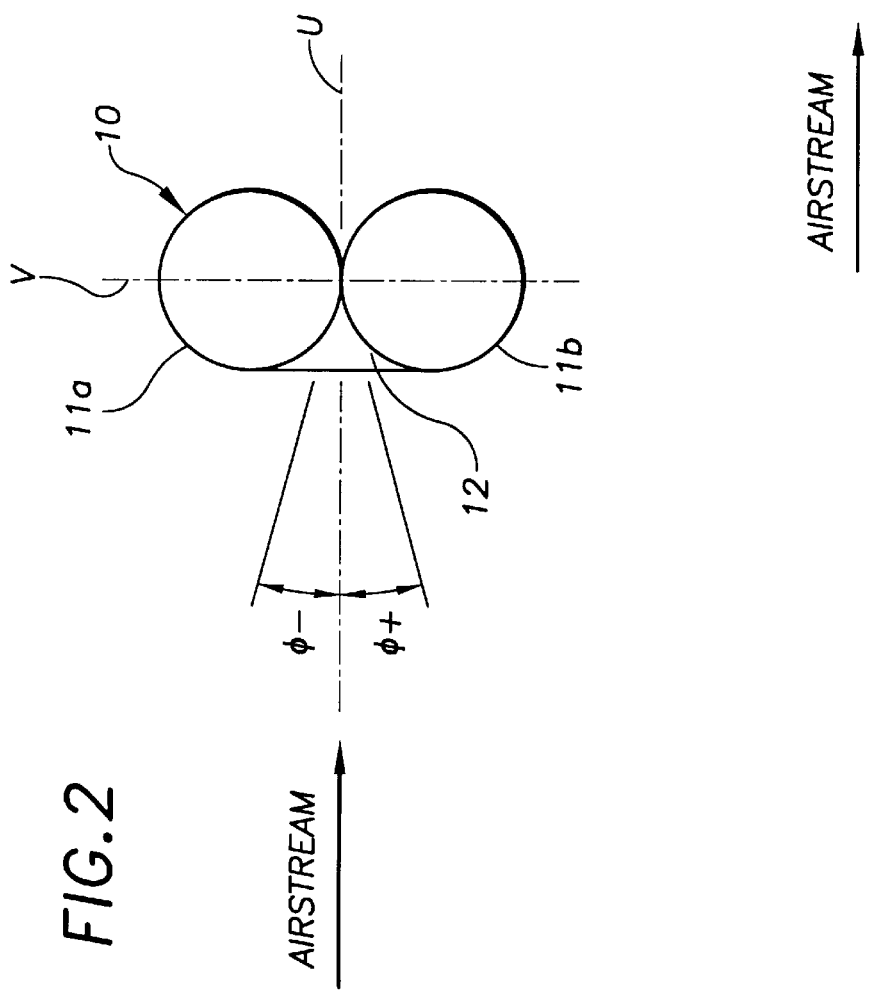
FIG.2
FIG.3

AIRSTREAM

AIRSTREAM

THERMAL ANEMOMETER AIRCRAFT AIRSPEED GUST COMPONENT TRANSDUCER

TECHNICAL FIELD

The invention relates generally to improved airspeed transducer apparatus for determining aircraft airspeed and aircraft airspeed cross-components. The invention discloses a fast response thermal anemometer airspeed transducer that uses a heated cylindrical sensing element pair for instantaneous airspeed and airspeed cross-component measurement. The invention further discloses the combination of two sets of element pairs oriented for multi-component gust sensing and multi-component turbulence sensing together with concurrent measurement of instantaneous airspeed. Single electrical driver circuit operation of the airspeed transducer for one or two component sensing is disclosed. The disclosed airspeed transducer is electrical with no moving parts.

BACKGROUND ART

The prior art of airspeed measurement is dominated for more than fifty years by pressure responsive probes based on pitot-static tubes and similar pneumatic devices, singly or in multiple arrangements. Notable are various multi-ported cylindrical and spherical probes as well as multi-dimensional "cobra" and "claw" probes, and the like. A combination vane and pressure difference "Air Speed And Attitude Probe" is disclosed by U.S. Pat. No. 4,184,149 that uses electromechanical and pneumatic sensors. A multi-ported differential pressure probe system for measuring air stream characteristics, static pressure, and turbulence intensity is disclosed by U.S. Pat. No. 5,233,865.

Electrical airspeed measurement by thermal anemometry variations has emphasized low speed measurements, generally lower than routine aircraft operating airspeeds. The use of heated metal film strips and rings capable of operating at aircraft cruising airspeeds is disclosed by U.S. Pat. No. 3,352,154. Segmented heated films on a sensing body to measure airflow speed and direction is disclosed by U.S. Pat. No. 3,604,261. U.S. Pat. No. 3,677,085 discloses a spaced apart hot wire pair, embedded in a support, that measures in-line bidirectional flow in a pipe. A pair of heated sensing elements, with a figure-eight cross-section, is disclosed by U.S. Pat. No. 3,900,819, where free-field flow is measured in the plane containing both sensing element axes.

A more up-to-date disclosure of the use of a single heated cylinder for airspeed measurement is outlined in the specification for U.S. Pat. No. 5,639,964. It is taught that instantaneous airspeed and a planar component of longitudinal airspeed can be selected from a composite airspeed signal by appropriate low-pass and band-pass filtering. Paired hot film multi-component thermal anemometry is taught by U.S. Pat. Nos. 5,357,795, 5,218,865, and prior patents. Construction of a wire wound sensing element for use in air flow metering is taught by U.S. Pat. No. 4,513,615.

Most anemometers intended for meteorological and helicopter airspeed measurements are inappropriate for use on aircraft because of their relative fragility and inability to withstand continuous airstream punishment by rain and frozen precipitation, and their general design approach which focuses on open free-field measurements in two-dimensional and, in some cases, three-dimensional space, rather than the measurement of dominant flow from one direction as in the case of an aircraft airspeed sensor.

It is, therefore, an object of the instant invention to provide a rugged fast response aircraft airspeed and airspeed cross-component transducer capable of direct sensing of instantaneous airspeed as well as turbulence components.

SUMMARY OF THE INVENTION

The present invention provides a significant improvement in the measurement of aircraft airspeed by incorporating a pair of fast response electrically heated cylindrical sensing elements in a parallel arrangement that is exposed broadside to the incident airstream in a way to simultaneously measure both instantaneous airspeed and a cross-component of airspeed. A combination of two pairs, driven by a common electronic control circuit, provides two cross-components of airspeed as well as instantaneous airspeed. The measurements are coherent, that is they are derived from the same excitation source to operate the plural sensing elements simultaneously without phase shift. The instant transducer invention is fast enough to provide cross-components of airstream turbulence, directly sensed by the airspeed transducer. Cross-component output is direct and is bi-polar in nature with response frequency to zero or d-c, thus facilitating direct measurement of aircraft angle-of-attack simultaneously with measurement of turbulence fluctuations. A single transducer can be used for measurement of instantaneous airspeed, angle-of-attack, turbulence cross-components, and total turbulence. Differential operation of the heated sensing element pair provides an exceptional signal dynamic range with threshold measurement to zero and with infinite resolution throughout the airspeed operating range. A total turbulence signal output from the fast response thermal anemometer airspeed transducer, made in accordance with the present invention, can be used in the measurement and computation of T.K.E. or turbulent kinetic energy. Knowledge of airframe continued exposure to T.K.E. has a direct bearing on aviation safety. Such knowledge is aided by the instant invention which can be realized in hardware form at low manufacturing cost and low installed cost on operating aircraft.

BRIEF DESCRIPTION OF THE DRAWING

FIG. 2 is an outline sectional view of the transducer sensing element pair illustrated in FIG. 1, taken along the line 2—2 thereof and looking in the direction of the arrows.

FIG. 3 illustrates a cross-section of a single sensing element together with bridging material, shown in FIG. 1.

BEST MODE OF CARRYING OUT THE INVENTION

Figure 1:
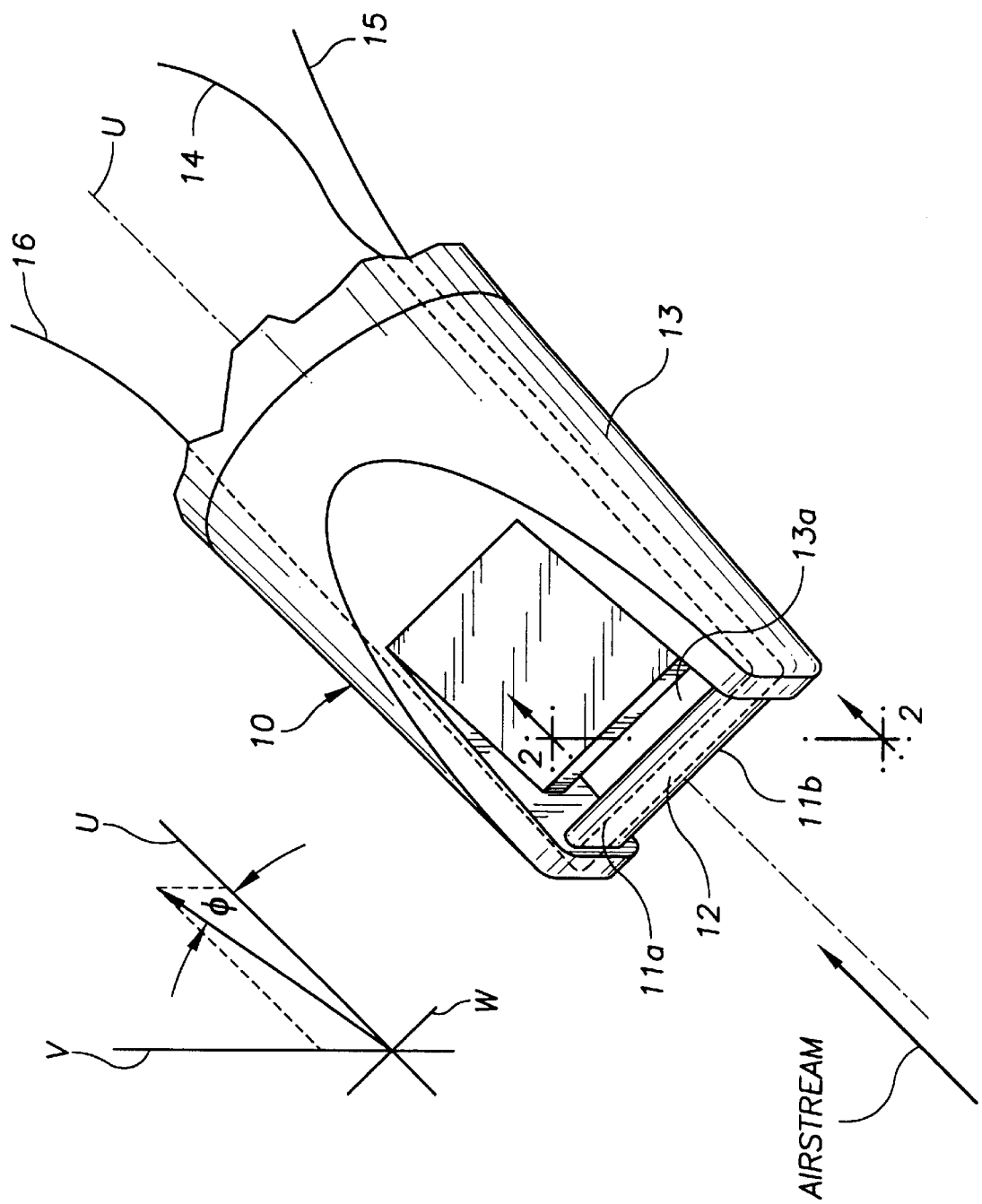
FIG. 1 is a perspective view of a thermal anemometer airspeed transducer made in accordance with the principles of the present invention.

Referring now to the drawing, and in particular to FIG. 1, the numeral 10 generally designates a thermal anemometer airspeed transducer made in accordance with the principles of the present invention. In a preferred embodiment, a pair of identical cylindrical resistive sensing elements, 11a and 11b, is shown supported parallel to each other and broadside against impinging airstream flow by structure 13. Such flow is realized when airspeed transducer 10 is mounted on an aircraft, with transducer 10 longitudinal axis U oriented parallel to the direction of flight and with sensing elements 11a and 11b facing forward. A smooth front face is provided by placement of bridging material 12 across sensing elements 11a and 11b, thereby filling in the cusp formed by the tangent cylinder pair. Sensing elements 11a and 11b are electrically resistive, self-heated by passage of an electric current, with connections at lead wires 14 and 15. Both elements are in series electrical connection with their midpoint junction connected to lead wire 16. Dominant airflow against transducer 10 is nominally perpendicular to sensing elements 11a and 11b, positioned by support structure 13, in the vertical UV plane along axis U, illustrated by the coordinate system. Vertical variations in airstream airflow occur on the V axis, with lateral or transverse variations occurring on the W axis in the UW or horizontal plane. Both instantaneous airspeed and an airspeed cross-component are simultaneously sensed by airspeed transducer 10. The sum of element 11a and 11b signal output indicates instantaneous airspeed while their difference indicates an airspeed cross-component.

Sensing element 11a and 11b dimensions can be selected to control sensitivity or lack of sensitivity to lateral airflow in the UW plane as taught by U.S. Pat. Nos. 5,639,964 and 5,357,795 respecting choice of length-to-diameter ratios. Support 13 is intended to rigidly support element pair 11a and 11b at their ends while allowing free passage of air above and below the element pair. Elements 11a and 11b can be supported in a free field, with a gap 13a between elements 11a and 11b and support 13, or the support structure 13 can be knife-like or wedge-like in vertical longitudinal cross-section with the reduced edge close to or in contact with elements 11a and 11b for added mechanical support against airstream-borne particle impact. For the sake of clarity, a gap 13a is shown in FIG. 1.

Although horizontal orientation of sensing elements 11a and 11b is shown by FIG. 1, transducer 10 may be axially rotated 90° around its U axis if measurement of lateral airspeed component variations is desired. In this event, sensing elements 11a and 11b are vertically oriented. Two transducers 10 can be combined, alongside each other, to sense airspeed variations in both the vertical UV and horizontal UW planes simultaneously. In viewing the front face of a combined transducer, the two sets of element pairs may describe an "L" or a "T". A fast response thermal anemometer airspeed sensor capable of sensing instantaneous airspeed as well as both vertical and horizontal components can be called a gust sensor or gust probe. A single control circuit can be configured to operate all of the transducer sensing elements in coherent fashion. This facilitates simultaneous determination of instantaneous airspeed vector components with minimal phase error. Alternatively, each component axis transducer, vertical and horizontal, can be operated independently if it is decided to separately locate or position both transducers on the airframe.

FIG. 2 is an outline sectional view of transducer 10 sensing element pair 11a and 11b shown in FIG. 1 taken along the line 2—2 thereof. Elements 11a and 11b are two identical heated cylinders that are joined or fused together along their length by filler material 12, thus presenting a smooth front face to the airstream while covering a portion of their exposed outer cylindrical heat transfer surfaces, enhancing differential heat loss from the pair. Although filler 12 is shown only in the forward cusp of the tangent element pair, filler 12 can also partly or completely fill the rear cusp, a slight decrease in differential sensitivity being noted when the rear cusp is filled. The impinging flow stagnation point moves across the front face of the filled sensing element pair, with boundary layer separation symmetrically from the rearward portion of both cylinders. Differential cooling increases as the airstream shifts away from zero incidence angle flow. Such cooling is determined by exposed projected cylinder surface areas seen by the impinging airstream as it changes angle-of-incidence. Both self-heated cylinders are equally cooled by the incident airstream when the angle-of-incidence, $\phi$, is zero. Lateral flow variations at zero incidence angle cause equal cooling of the element pair. As the airstream moves away from horizontal flow, either cylinder 11a or 11b will be cooled more than the other. Lessened cooling will be experienced by the downwind cylinder, the cylinder that is away from incident airflow and greater cooling will occur to the closer cylinder. When an updraft is encountered, with an airstream positive incidence angle $\phi+$, sensing element 11b experiences greater cooling than element 11a. When a downdraft occurs, with an airstream negative incidence angle $\phi-$, sensing element 11a experiences greater cooling than sensing element 11b.

FIG. 3 illustrates a cross-section of sensing element 11a, shown in FIG. 1, together with a portion of bridging material 12, describing a ceramic supported wire wound resistive sensing element that is fused into a thin wall stainless steel protection tube. Sensing element 11a consists of an electrically non-conductive dense aluminum oxide refractory hollow tubular cylindrical substrate body 17, upon the surface of which is wound a fine platinum wire 18 resistance element evenly spaced along the length of substrate 17, and connected by welding to platinum lead wires 14 and 16 fused or glazed into each end of substrate 17. Typical lead wire 14 and 16 sizes can be in 0.006" to 0.010" diameter range, with winding 18 in the range of 0.002" to 0.003" diameter, although larger or smaller diameters can be used as may be determined by the desired electrical resistance value and operating power level. Lead wires 14 and 16 are passed a short distance, several wire diameters, into the substrate 17 bore and fused in place with silica glaze such as Engelhard Corp. #6624 Squeegee Overglaze or similar material, fired in air at about 625° C. for several minutes. Substrate 17, with leads 14 and 16, is wound along its length with fine platinum wire to form the resistive sensing element active portion. Several wire turns are wrapped around the lead wires at each end and are spot welded by capacitance discharge welding or similar process. Typical winding resistance is in the several ohms range for 0.003" diameter wire when wound on an 0.031" diameter substrate about 0.400" in length. Actual wound resistance value is determined by physical size and number of turns or winding pitch. Commercial grade platinum wire will result in a winding that has a positive temperature coefficient of resistance versus temperature of about 3,850 parts per million per degree Centigrade.

After the winding is complete the entire substrate and winding can be overglazed 19 with a thin layer of the same glaze used to fuse the leads into the substrate bore. After firing, in the same fashion as for lead attachment, a further step is to slip the glazed assembly into a fine thin wall stainless steel protection tube 20, along with a coating of glaze, and then refire to fuse the entire assembly together. Materials like Engelhard #6624 tolerate refiring without difficulty, provided that no mechanical stresses are placed on the lead wires during firing. Glaze fusion of the winding to the protection tube inner wall ensures uniform heat transfer from the platinum winding 18 to the outer surface of the protection tube 20 and such fusing produces a rugged long-lived element structure. After firing it will be noted that the stainless steel shell 20 will have become ebonized, exhibiting the characteristic dark color that nickel alloys acquire when heated beyond the Curie temperature point of nickel. Alternatively, wound substrate 17 can be slid into the stainless steel tube 20 along with an aluminum oxide charged silicone heat sink compound such as Dow Corning 340 so that conductive heat transfer is assured between winding 18 and the protection tube 20.

Bridging material 12 is used to securely position both cylinders 11*a* and 11*b* and an efficient conductor of heat must be avoided so as not to diminish differential heat loss from the joined element pair. Metallic brazing, welding, or soldering as a joining method is not appropriate. A strong permanent bridge 12 can be provided by use of a refractory glaze. A semi-flexible polymer such as silicone resin or room temperature vulcanizing (RTV) silicone rubber adhesive can be used. Material choice will be determined by desired ruggedness and the particular airspeed transducer application. A refractory material or a lower temperature polymer are effective since they are fairly poor conductors of heat when in bulk form. Routine sensing element 11*a* and 11*b* operating temperatures are below 150° C., well within the useful temperature range of most polymers.

The disclosed preferred embodiment uses platinum as the material of choice for resistive sensing element 11*a* winding 18 and lead wires 14 and 16 because of platinum's exceptional long term stability and ease of use and fabrication. Other non-zero temperature coefficient of resistance conductor materials can be used. These may include nickel or other wire, metal films, composition resistors, and similar materials. Thermistor rods can also be used although their temperature coefficient is generally negative-going and requires a somewhat different electrical controller design approach than that used by positive temperature coefficient sensing elements. Any use of dissimilar conductors, at the heated sensing element connections, must be avoided in order not to build in unwanted noise generators and thermoelectric junctions.

Protection tube 20, described above as stainless steel, can also be a material such as dense aluminum oxide refractory ceramic tubing which is an excellent conductor of heat, is very strong, will accept glaze fusing with ease, and long term exposure to airstream driven rain and grit will have little if any adverse effect. Coatings, such as vitreous fired-on glasses or glazes, Teflon (a trademark), polymers, and similar materials can also be used. Glaze protected sensing elements, bridged by glass or silicone resin, can be highly effective as a research transducer or low cost unit for relatively short term use.

Figure 4:
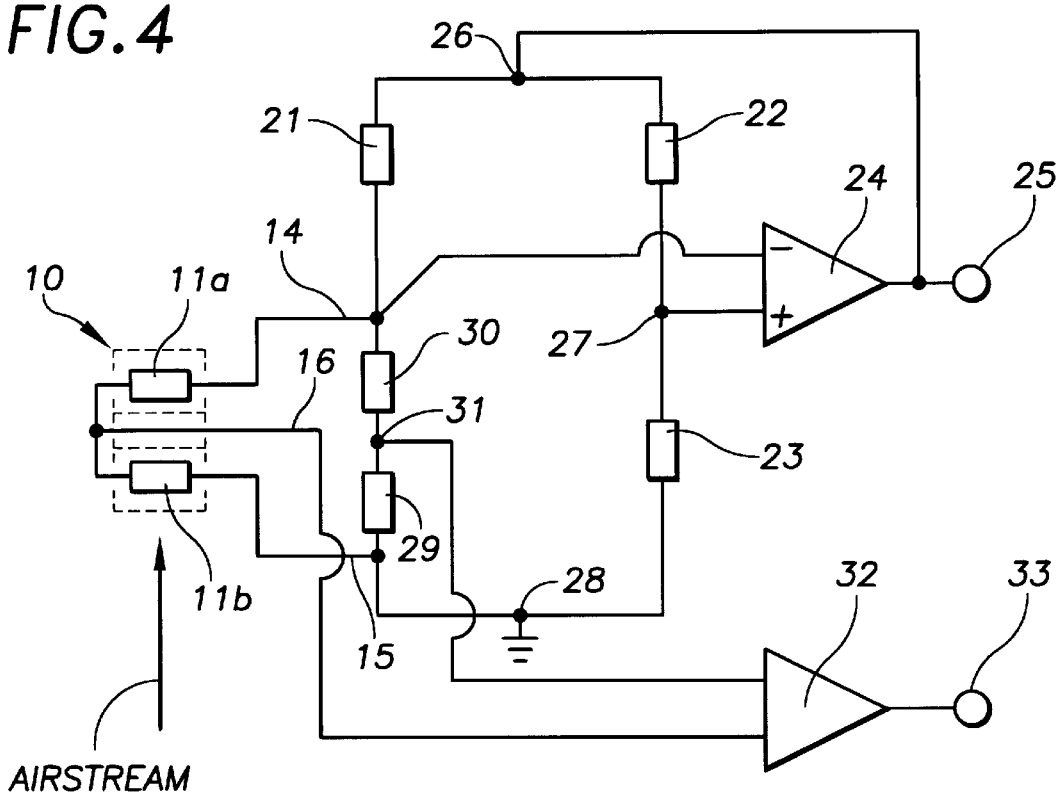
FIG. 4 is a simplified electrical schematic drawing of a control circuit that may be used to operate transducer sensing elements of the type shown in FIGS. 1–3.

FIG. 4 is a simplified control circuit that can be used to operate sensing elements 11*a* and 11*b* of airspeed transducer 10. The illustrated excitation method can be described as feedback controlled constant temperature (constant resistance) operation. A series connected sensing element pair, both connected as one arm of a feedback controlled Wheatstone bridge, is held at constant resistance by a control circuit that automatically adjusts bridge excitation to add heating power to the sensing element pair to balance and make up heat lost to airstream cooling. The distribution of heat loss, or differential cooling of the element pair, is taken as a measure of cross-flow and total heat loss from the pair is taken as a measure of instantaneous airspeed.

The Wheatstone bridge is formed by sensing element pair 11*a* and 11*b* as one bridge arm that has a large temperature coefficient of resistance, by resistor 21 which is a low temperature coefficient power resistor that passes full heating current through the sensing element pair and forms a second bridge arm, and by resistors 22 and 23 that form the third and fourth bridge reference arms, completing the bridge. Resistors 22 and 23 are chosen to set bridge balance at the desired constant resistance value for the first bridge arm including sensing elements 11*a* and 11*b* which rise to a resistance value that balances the bridge. Fast response, very high gain, amplifier 24 is operatively connected to detect the error signal developed between points 14 and 27, amplify the signal and feed current back to the top of the bridge circuit at 26 to provide bridge excitation with heating current to the series sensing element pair.

Operating temperature level of sensing element pair 11*a* and 11*b* can be automatically adjusted to track ambient temperature change by using an RTD, or resistance temperature detector, in place of resistor 23, above described as a bridge reference arm. By tracking ambient temperature change, constant elevated temperature operation above sensed ambient temperature is used to provide constant sensitivity operation of airspeed transducer 10. Amplifier 24 output signal 25 is representative of instantaneous airspeed, or the signal at 14 can similarly be used, both with respect to ground 28. In this manner, instantaneous airspeed is taken as the sum of the signals from both sensing elements 11*a* and 11*b*. Their difference, taken at point 16, when element 11*a* output is compared with element 11*b* output, is used to determine a cross-component of airspeed.

If analog circuit means are used to read out the operating condition of element pair 11*a* and 11*b*, a bridge within a bridge is formed by placing a resistance divider pair, 29 and 30, across elements 11*a* and 11*b*, and a differential readout is taken across points 16 and 31 by differential amplifier 32 whose bi-polar output 33 directly represents the airstream cross-component. When digital circuit means are used to read out the operating condition of element part 11*a* and 11*b*, points 14, 16, and 15 are scanned to measure both instantaneous airspeed and airspeed cross-component signal levels needed to process and compute the desired output information.

Details of double Wheatstone bridge operation and constant temperature operation of paired heated sensing elements are taught by U.S. Pat. Nos. 5,069,066 and 5,357,795.

Figure 5:
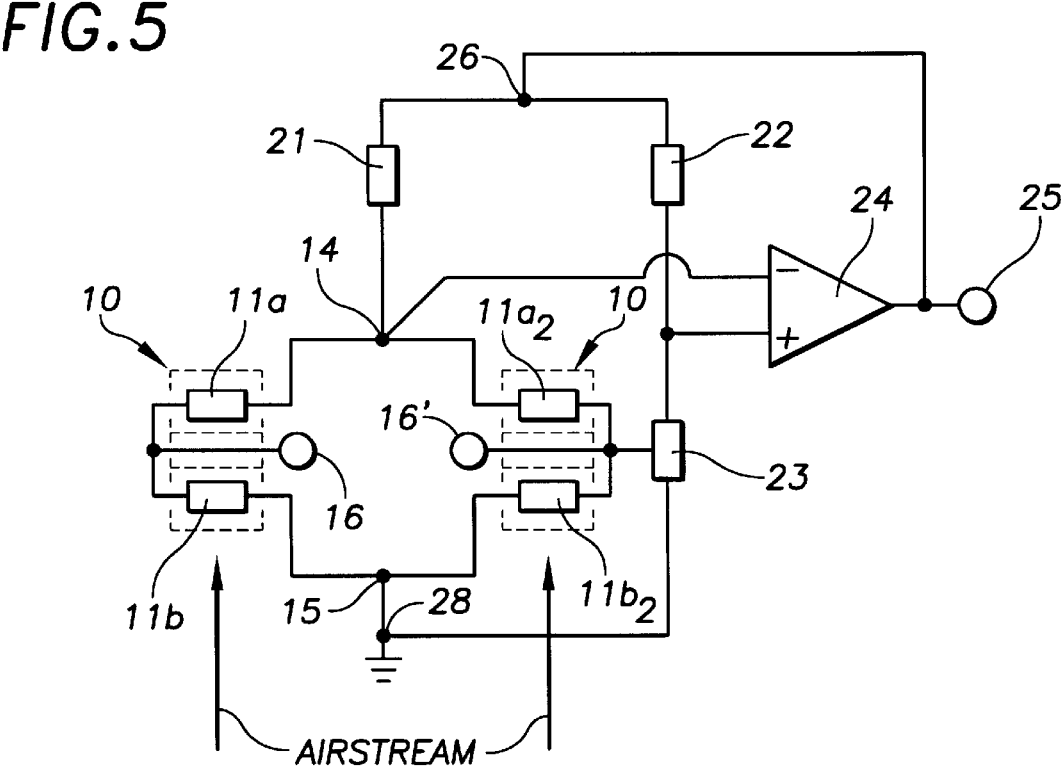
FIG. 5 is a simplified electrical schematic drawing of a control circuit that may be used to operate two transducers of the type shown in FIG. 1.

FIG. 5 is a simplified electrical schematic drawing of a constant temperature feedback controlled driver circuit configured to control and excite two airspeed transducers 10, combined for operation as a multi-component gust sensor or airspeed turbulence transducer. The circuit is the same as that illustrated in FIG. 4, together with the addition of a second sensing element pair, 11*a*$_2$ and 11*b*$_2$, connected across sensing element pair 11*a* and 11*b* at points 14 and 15. Bridge drive, control, feedback, and signal readout are as described for FIG. 4. Dual connection of electrically paralleled sensing element pairs as the driven active temperature responsive bridge arm assures coherent single-source operation of both elements pairs. As above, instantaneous airspeed output is taken as the sum of sensing element excitation while the two component outputs are taken by comparing members of each element pair, 11*a* with 11*b*, and 11*a*$_2$ with 11*b*$_2$. Element orientation is as described above, under FIG. 1. In addition to assuring signal coherence and ease of component signal correlation, a further advantage in using a single drive circuit is gained by minimum parts count. This facilitates a reduction in electronics package size, allowing use of a smaller transducer supporting body, and results in simplified mounting of the airspeed transducer on an aircraft.

The above description presents the best mode contemplated in carrying out the invention.

The invention is, however, susceptible to modifications and alternate constructions from the embodiments shown in the drawing and described above. Consequently, it is not the intention to limit the invention to the particular embodiments disclosed. On the contrary, the invention is intended and shall cover all modifications, arrangements and alternate constructions falling within the spirit and scope of the invention, as expressed in the appended claims when read in the light of the description and drawing.

What is claimed is:

1. A thermal anemometer airspeed gust component transducer comprising:
    a tangent pair of cylindrical electrically resistive sensing elements joined along their length and shaped to form a flat face, said flat face oriented against airstream flow, the overall shape of the transducer formed by said flat face tangent to said cylindrical sensing elements being as a figure B in cross section;
    mechanical structure supporting said pair of sensing elements with the plane containing their parallel axes perpendicular to impinging airstream flow, and
    each of said electrically resistive sensing elements provided with electrical connection means whereby each electrically resistive sensing element is self-heated by an electric current passing through each resistive sensing element.

2. A thermal anemometer airspeed gust component transducer comprising:
    combination of two airspeed transducers as defined by claim 1, wherein two said pairs of sensing elements are supported by common shared mechanical structure means, said transducers axially rotated 90 degrees to each other thereby sensing perpendicular cross-components of impinging airsteam flow.

3. A thermal anemometer airstream gust component transducer as defined in claim 2, wherein:
    both said sensing elements of each of said pairs of sensing elements are operatively connected in series electrical connection and both said pairs of sensing elements are operatively connected in parallel electrical connection as one arm of a four arm Wheatstone bridge in constant temperature anemometer means of the type having bridge circuit means with feedback circuit means operatively connected from amplifier means to said Wheatstone bridge means to provide heating current drive excitation to both said sensing elements pairs from common single drive circuit means.

* * * * *